(12) United States Patent
Fujii

(10) Patent No.: US 12,483,024 B2
(45) Date of Patent: Nov. 25, 2025

(54) POWER SUPPLY DEVICE, CONTROL DEVICE FOR POWER SUPPLY CIRCUIT, AND PROGRAM

(71) Applicant: Murata Manufacturing Co., Ltd., Nagaokakyo (JP)

(72) Inventor: Kenta Fujii, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 199 days.

(21) Appl. No.: 18/418,453

(22) Filed: Jan. 22, 2024

(65) Prior Publication Data

US 2024/0364098 A1    Oct. 31, 2024

(30) Foreign Application Priority Data

Apr. 28, 2023   (JP) ................. 2023-074760

(51) Int. Cl.
*H02H 7/122* (2006.01)
*H02H 3/20* (2006.01)
*H02M 1/36* (2007.01)

(52) U.S. Cl.
CPC ............ *H02H 7/1227* (2013.01); *H02H 3/20* (2013.01); *H02M 1/36* (2013.01)

(58) Field of Classification Search
CPC ........ H02H 7/122; H02H 3/20; H02H 7/1227; H02M 1/36; H02M 3/00
USPC .................................. 361/86–87, 93.7–93.9
See application file for complete search history.

(56) References Cited

U.S. PATENT DOCUMENTS

| | | | |
|---|---|---|---|
| 2013/0234518 A1* | 9/2013 | Mumtaz .................. | H02M 3/04 307/45 |
| 2023/0216297 A1* | 7/2023 | Peri .......................... | H02J 3/38 307/43 |

FOREIGN PATENT DOCUMENTS

JP     05-207655 A     8/1993

* cited by examiner

*Primary Examiner* — Danny Nguyen
(74) *Attorney, Agent, or Firm* — Keating & Bennett, LLP

(57) ABSTRACT

A power supply device includes a power supply circuit and a controller for the power supply circuit. The power supply circuit includes a battery to supply power to a load via power lines, a switch and a power conversion circuit on a high-potential power line, and a voltage detector to detect an output voltage to be output to the load. The controller includes a differential processor to output a differential value corresponding to the output voltage, an integral processor to output an integral value obtained by integrating the differential value over a unit time interval, and a switch control processor to control an ON state and an OFF state of the switch. The differential processor is configured or programmed to output the differential value that is obtained by differentiating a difference between the output voltage and the integral value. The switch control processor is configured or programmed to change the switch to the OFF state when the differential value reaches a threshold.

19 Claims, 3 Drawing Sheets

POWER SUPPLY DEVICE, CONTROL DEVICE FOR POWER SUPPLY CIRCUIT, AND PROGRAM

CROSS REFERENCE TO RELATED APPLICATIONS

This application claims the benefit of priority to Japanese Patent Application No. 2023-074760 filed on Apr. 28, 2023. The entire contents of this application are hereby incorporated herein by reference.

BACKGROUND OF THE INVENTION

1. Field of the Invention

The present invention relates to a power supply device, a control device for a power supply circuit, and a non-transitory computer-readable medium including a program for a power supply circuit.

2. Description of the Related Art

Japanese Unexamined Patent Application Publication No. 05-207655 discloses a power supply device including a detection circuit that detects an output overcurrent. The detection circuit includes an overcurrent detection unit, a voltage differential calculation unit, a differential value detection unit, and a third logic circuit. The overcurrent detection unit determines whether an output current from the power supply device is an overcurrent. The voltage differential calculation unit calculates a differential value of an output voltage of the power supply device. The differential value detection unit determines whether the differential value is greater than or equal to a set value. The third logic circuit outputs a load failure signal when an overcurrent is detected and the differential value is greater than or equal to the set value.

In the power supply device described in Japanese Unexamined Patent Application Publication No. 05-207655, the voltage differential calculation unit calculates a differential value of an output voltage including noise. Therefore, when large noise is superimposed on the output voltage, the differential value calculated by the differential value detection unit is affected by a variation caused by the noise. As a result, due to the noise, the third logic circuit outputs an incorrect load failure signal. On the other hand, when a failure, such as a load short circuit, occurs, it is necessary to quickly stop the overcurrent. Therefore, it is desired to both prevent false detection due to noise and quickly stop an overcurrent.

SUMMARY OF THE INVENTION

An example embodiment of the present invention provides a power supply device including a battery to supply power to a load via a power line, a switch on the power line and switchable between an ON state and an OFF state, a power conversion circuit on the power line, a voltage detector to detect an output voltage to be output to the load, a differential processor configured or programmed to output a differential value corresponding to the output voltage, an integral processor configured or programmed to output an integral value obtained by integrating the differential value output from the differential processor over a unit time interval, and a switch control processor configured or programmed to change the switch to the OFF state. The differential processor is configured or programmed to output the differential value that is obtained by differentiating a difference between the output voltage and the integral value, and the switch control processor is configured or programmed to change the switch to the OFF state when the differential value reaches a threshold.

Another example embodiment of the present invention provides a control device control device for a power supply circuit including a battery to supply power to a load via a power line, a switch on the power line and switchable between an ON state and an OFF state, a power conversion circuit on the power line, and a voltage detector to detect an output voltage to be output to the load, the control device including a differential processor configured or programmed to output a differential value corresponding to the output voltage, an integral processor configured or programmed to output an integral value obtained by integrating the differential value output from the differential processor over a unit time interval, and a switch control processor configured or programmed to change the switch to the OFF state. The differential processor is configured or programmed to output the differential value that is obtained by differentiating a difference between the output voltage and the integral value, and the switch control processor is configured or programmed to change the switch to the OFF state when the differential value reaches a threshold.

According to a further example embodiment of the present invention, a non-transitory computer-readable medium includes a program for a power supply device including a battery to supply power to a load via a power line, a switch on the power line and switchable between an ON state and an OFF state, a power conversion circuit on the power line, a voltage detector to detect an output voltage to be output to the load, and a controller to control the switch, and the program causes the controller to perform: differential processing of outputting a differential value corresponding to the output voltage, integral processing of outputting an integral value obtained by integrating the differential value output by the differential processing over a unit time interval, and a switch control process of switching the switch to the OFF state when the differential value reaches a threshold. The differential processing outputs the differential value obtained by differentiating a difference between the output voltage and the integral value.

With the above configurations, the differential processor is configured or programmed to output the differential value obtained by differentiating the difference obtained by subtracting the integral value output by the integral processor from the output voltage. The integral value output from the integral processor through the differential processing and the integral processing corresponds to a value obtained by reflecting, to some extent, a past noise component in an output voltage that is supposed to be output, i.e., an output voltage on which noise is not superimposed. By feeding back the integral value to the input of the differential processor, noise in the output voltage can be reduced with the continuous change in the output voltage intact. This in turn makes it possible to reduce false detection due to noise in detecting an abnormality in the output voltage to be output to the load. The above configurations also make it possible to determine that an abnormality has occurred based on a single detection and thus makes it possible to quickly stop an overcurrent. This in turn makes it easier to protect elements in the power supply circuit.

Example embodiments of the present invention make it possible to quickly stop an overcurrent while reducing false detection due to noise.

The above and other elements, features, steps, characteristics and advantages of the present invention will become more apparent from the following detailed description of the example embodiments with reference to the attached drawings.

DETAILED DESCRIPTION OF THE EXAMPLE EMBODIMENTS

Power Supply Devices, Control Devices for Power Supply Circuits, and Non-Transitory Computer-readable Media Including Programs According to Example Embodiments Power supply devices, control devices for power supply circuits, and non-transitory computer-readable media including programs according to example embodiments are described below with reference to the drawings. Detailed descriptions below are for illustrative purposes only and are not intended to limit example embodiments of this disclosure and applications and use of the example embodiments.

Power Supply Circuit

Figure 1:
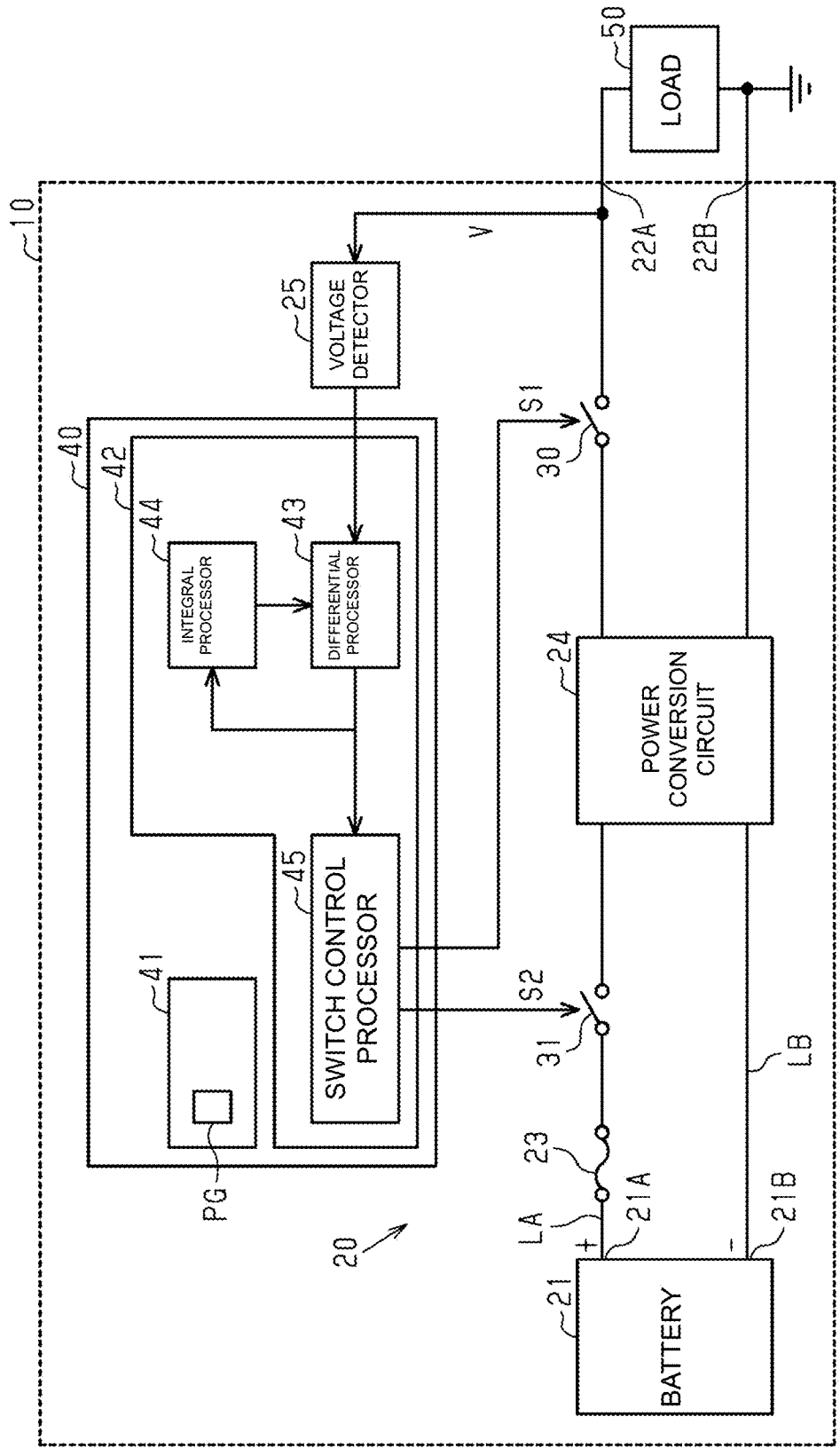
FIG. 1 is a schematic diagram of a configuration of a power supply device.

As illustrated in FIG. 1, a power supply device 10 includes a power supply circuit 20. The power supply circuit 20 includes a battery 21, a high-potential power line LA, a low-potential power line LB, a high-potential output terminal 22A, and a low-potential output terminal 22B.

The battery 21 can supply direct-current (DC) power to a load 50 via the power lines and the output terminals. The battery 21 is, for example, a lithium-ion battery. The battery 21 includes a positive terminal 21A and a negative terminal 21B. A first end of the high-potential power line LA is connected to the positive terminal 21A of the battery 21. A second end of the high-potential power line LA is connected to the high-potential output terminal 22A. The high-potential output terminal 22A is connectable to the load 50. A first end of the low-potential power line LB is connected to the negative terminal 21B of the battery 21. A second end of the low-potential power line LB is connected to the low-potential output terminal 22B. The low-potential output terminal 22B is connectable to the load 50. Also, the low-potential output terminal 22B is set at the ground potential. The load 50 is driven by a DC voltage from the power supply device 10. The load 50 is, for example, a server or a storage in a data center.

The power supply circuit 20 includes a fuse 23 disposed on the high-potential power line LA. That is, a first end of the fuse 23 is connected to the positive terminal 21A of the battery 21. A second end of the fuse 23 is connected to the high-potential output terminal 22A. The fuse 23 melts to shut off an electric current when the electric current exceeds a certain level.

The power supply circuit 20 includes a power conversion circuit 24 disposed on the high-potential power line LA and the low-potential power line LB. That is, a high-potential input terminal of the power conversion circuit 24 is connected to the positive terminal 21A of the battery 21 via the fuse 23. A high-potential output terminal of the power conversion circuit 24 is connected to the high-potential output terminal 22A. Also, a low-potential input terminal of the power conversion circuit 24 is connected to the negative terminal 21B of the battery 21. A low-potential output terminal of the power conversion circuit 24 is connected to the low-potential output terminal 22B. Also, operations of the power conversion circuit 24 are controlled by a control circuit (not shown).

The power conversion circuit 24 is, for example, a DC-DC boost converter. That is, the power conversion circuit 24 boosts a voltage input from the battery 21 to a predetermined voltage for the load 50 and outputs the boosted voltage.

The power supply circuit 20 includes a first switch 30 and a second switch 31. Each of the first switch 30 and the second switch 31 is disposed on the high-potential power line LA and can be switched between an ON state and an OFF state.

The first switch 30 is disposed between the power conversion circuit 24 on the high-potential power line LA and the high-potential output terminal 22A connectable to the load 50. Although not illustrated, the first switch 30 includes one or more switching elements, such as, for example, N-type metal-oxide semiconductor field-effect transistors (MOSFETs).

The second switch 31 is disposed between the battery 21 and the power conversion circuit 24 on the high-potential power line LA. Although not illustrated, the second switch 31 includes one or more switching elements, such as, for example, N-type metal-oxide semiconductor field-effect transistors (MOSFETs).

The power supply circuit 20 includes a voltage detector 25. The voltage detector 25 detects the potential difference between the high-potential output terminal 22A and the low-potential output terminal 22B of the power supply circuit 20 as an output voltage V to be output to the load 50.

Control Device for Power Supply Circuit and Program

As illustrated in FIG. 1, the power supply device 10 includes a controller 40 for the power supply circuit 20 (hereafter simply referred to as the "controller 40"). The controller 40 acquires the output voltage V detected by the voltage detector 25. Also, the controller 40 outputs a first control signal S1 to change the first switch 30 between the ON state and the OFF state. Similarly, the controller 40 outputs a second control signal S2 to change the second switch 31 between the ON state and the OFF state.

The controller 40 includes a storage device 41 and an arithmetic processor 42. That is, the controller 40 is a microcontroller unit (MCU). The storage device 41 stores various programs to be executed by the arithmetic processor 42. One of the programs is a voltage abnormality detection program PG to detect an abnormality in the output voltage V. The arithmetic processor 42 is configured or programmed to function as a differential processor 43, an integral processor 44, and a switch control processor 45 by executing the voltage abnormality detection program PG. In other words, the arithmetic processor 42 is configured or programmed to include the differential processor 43, the integral processor 44, and the switch control processor 45 as functional blocks. The arithmetic processor 42 includes, for example, a central processor (CPU) or a micro processor (MPU).

Voltage Abnormality Detection Control

Next, voltage abnormality detection control performed by the controller 40 is described. The arithmetic processor 42 executes the voltage abnormality detection program PG stored in the storage device 41 to perform steps in the voltage abnormality detection control. The voltage abnormality detection control is performed when the power supply device 10 starts to be driven.

Figure 2:
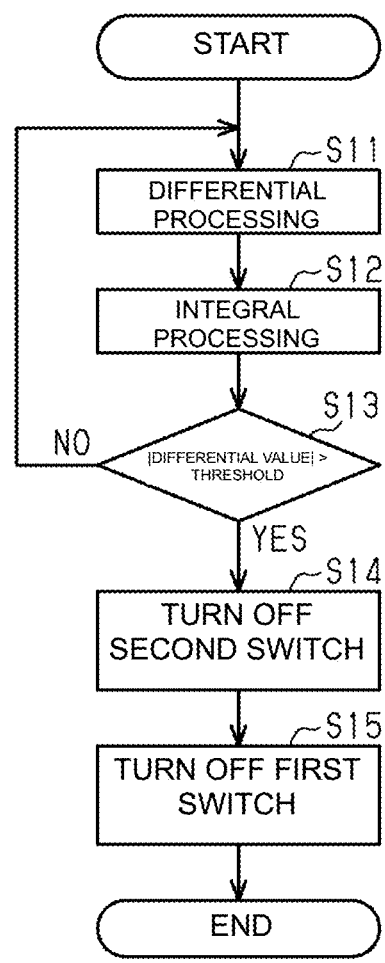
FIG. 2 is a flowchart illustrating voltage abnormality detection control.

As illustrated in FIG. 2, after starting the voltage abnormality detection control, the arithmetic processor 42 performs differential processing at step S11. Specifically, at step S11, the arithmetic processor 42 obtains the output voltage V detected by the voltage detector 25 from a unit time prior to the present. Also, the arithmetic processor 42 obtains an integral value that is output by the integral processor 44 the unit time ago from the present. Next, the arithmetic processor 42 functioning as the differential processor 43 calculates a difference between the output voltage V acquired by the voltage detector 25 and the integral value. Then, the arithmetic processor 42 outputs a differential value obtained by differentiating the difference. Alternatively, the arithmetic processor 42 may output a differential value that is obtained by multiplying a result of differentiating the difference by a predetermined coefficient. Here, when the differential processing is performed for the first time after the voltage abnormality detection control is started, integral processing described later has not been performed. In this case, for example, the differential processor 43 calculates the differential value by setting the integral value to 0.

Next, the arithmetic processor 42 of the controller 40 performs integral processing at step S12. Specifically, the arithmetic processor 42 functioning as the integral processor 44 integrates the differential value output from the differential processor 43 over a unit time interval. Next, the arithmetic processor 42 outputs the result of integration as an integral value. The unit time is, for example, about 100 milliseconds. As described above, the integral value output at step S12 is used in the differential processing at step S11 in the next cycle.

Next, the arithmetic processor 42 of the controller 40 performs step S13. First, the arithmetic processor 42 functioning as the switch control processor 45 compares the differential value output by the differential processor 43 with a predetermined threshold. Then, the arithmetic processor 42 determines whether the differential value has reached the threshold. In the present example embodiment, for example, the arithmetic processor 42 determines whether the absolute value of the differential value has reached the threshold. When the differential value is a positive value, that the absolute value of the differential value has reached the threshold indicates that the differential value has become greater than or equal to a positive threshold. When the differential value is a negative value, that the absolute value of the differential value has reached the threshold indicates that the differential value has become less than or equal to a negative threshold. When it is determined at step S13 that the absolute value of the differential value has not reached the threshold (S13: NO), the arithmetic processor 42 performs step S11 again.

On the other hand, when it is determined at step S13 that the differential value has reached the threshold (S13: YES), the arithmetic processor 42 of the controller 40 performs a switch control process at step S14. At step S14, the arithmetic processor 42 functioning as the switch control processor 45 outputs a second control signal S2 to switch the second switch 31 to the OFF state. Then, after a predetermined time, the arithmetic processor 42 of the controller 40 performs step S15. The predetermined time is determined in advance as a time from when the arithmetic processor 42 outputs the second control signal S2 to when the switching of the second switch 31 to the OFF state is completed.

In the switch control process at step S15, the arithmetic processor 42 functioning as the switch control processor 45 outputs a second control signal S2 to switch the first switch 30 to the OFF state. Then, the arithmetic processor 42 ends the voltage abnormality detection control.

Whether the voltage abnormality detection program PG is functioning can be confirmed by a method described below. First, a degree of noise (hereafter referred to as "suppressible degree of noise"), which can be suppressed by feeding back the integral value obtained by the integral processor 44 to the differential processor 43, is obtained. The degree of noise is represented by, for example, a signal-to-noise ratio. Here, the "suppressible degree of noise" varies depending on, for example, the unit time interval over which the arithmetic processor 42 functioning as the integral processor 44 performs definite integration. Next, tests (a) and (b) below are performed.

(a) A voltage, which is obtained by adding noise less than or equal to the "suppressible degree of noise" to the output voltage V, is input to the integral processor 44. In this state, the load 50 is short-circuited, and the output voltage V is reduced to substantially zero.

(b) A voltage, which is obtained by adding noise greater than the "suppressible degree of noise" to the output voltage V, is input to the integral processor 44. In this state, the load 50 is short-circuited, and the output voltage V is reduced to substantially zero.

When each switch is switched to the OFF state immediately after the output voltage V is reduced to substantially zero in test (a) and each switch is switched to the OFF state before the output voltage V is reduced to substantially zero in test (b), it is determined that the voltage abnormality detection program PG is normally functioning.

When each switch is not switched to the OFF state immediately after the output voltage V is reduced to substantially zero in test (a) or each switch is switched to the OFF state immediately after the output voltage V is reduced to substantially zero in test (b), it is determined that the voltage abnormality detection program PG is not normally functioning.

Comparison with Related Art

Below, operations of the power supply device 10 of the present example embodiment are compared with operations of a power supply device of a comparative example. First, the power supply device of the comparative example is described. The configuration of the power supply device of the comparative example is similar to the configuration of the power supply device 10 of the present example embodiment. However, the power supply device of the comparative example performs control that is different from the voltage abnormality detection control performed by the power supply device 10 of the present example embodiment.

Figure 3:
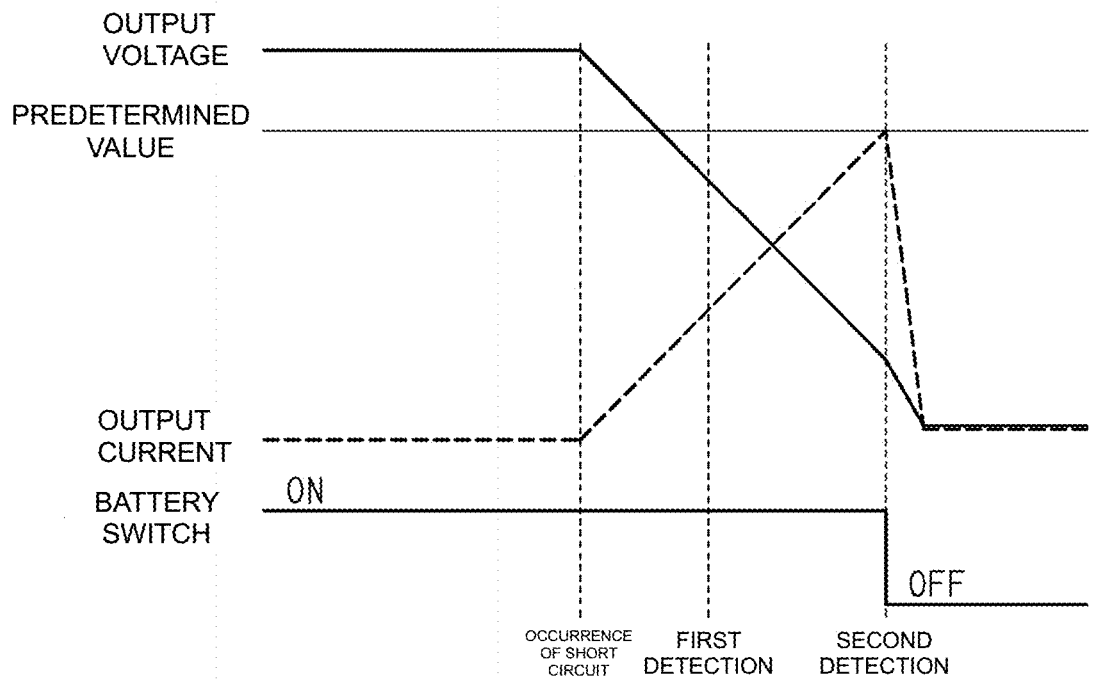
FIG. 3 is a timing chart illustrating operations of a power supply circuit according to a comparative example.

In the power supply device of the comparative example, the arithmetic processor of the control device can perform short circuit detection control. In the short circuit detection control, the arithmetic processor compares an output voltage with a predetermined value in each predetermined control cycle. Then, in the short circuit detection control, the arithmetic processor determines that a short circuit has occurred in the load when the output voltage falls below the predetermined value twice in a row. When it is determined that a short circuit has occurred in the load, the arithmetic processor changes the switch of the battery to the OFF state. Thus, in the power supply device of the comparative example, to detect a short circuit in the load while reducing false detection due to noise, the arithmetic processor determines that a short circuit has occurred when the output voltage continuously falls below a predetermined value for a period longer than the control cycle. With the power supply device of the comparative example, however, as illustrated in FIG. 3, the output current continues to increase due to the short circuit even after an output voltage below the predetermined value is detected for the first time. Then, the output current starts to decrease only after an output voltage below the predetermined value is detected for the second time and the switch of the battery is turned off. That is, while the power supply circuit of the comparative example can reduce false detection due to noise, the power supply circuit requires a relatively long time to determine the occurrence of a short circuit and therefore cannot quickly stop an overcurrent.

Figure 4:
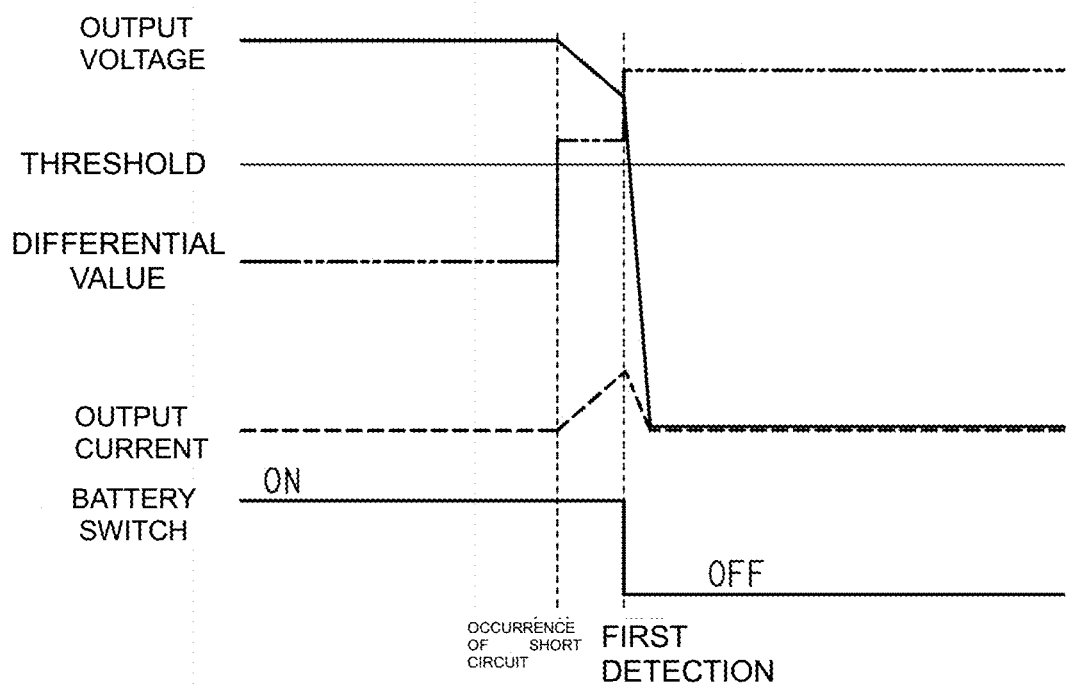
FIG. 4 is a timing chart illustrating operations of a power supply circuit according to an example embodiment of the present invention.

On the other hand, as described above, in the power supply device 10 of the present example embodiment, the integral processor 44 feeds back, to the differential processor 43, a value that reflects a past noise component to some extent. With this configuration, the power supply device 10 of the present example embodiment can reduce noise in the output voltage V with the continuous change in the output voltage V intact. That is, because the noise component has already been removed to some extent from the value input to the differential processor 43, false detection due to noise is unlikely to occur when determination is made based on an output from the differential processor 43. For this reason, in the power supply device 10 of the present example embodiment, it is not necessary to set such a condition that the output voltage falls below a predetermined value twice in a row, as in the power supply device of the comparative example. That is, as illustrated in FIG. 4, the power supply circuit 20 can detect an abnormality in the output voltage V output to the load 50 when the differential value reaches the threshold for the first time, i.e., at the first detection. Accordingly, the power supply circuit 20 of the present example embodiment can quickly stop an overcurrent while reducing false detection due to noise.

Effects of Present Example Embodiment (1) According to the above example embodiment, the differential processor 43 outputs a differential value that is obtained by differentiating a difference obtained by subtracting an integral value output by the integral processor 44 from the output voltage V. The integral value output from the integral processor 44 through the differential processing and the integral processing corresponds to a value obtained by reflecting, to some extent, a past noise component in an output voltage that is supposed to be output, i.e., an output voltage on which noise is not superimposed. By feeding back the integral value to the input of the differential processor 43, noise in the output voltage V can be reduced with the continuous change in the output voltage V intact. This in turn makes it possible to reduce false detection due to noise in detecting an abnormality in the output voltage V to be output to the load 50. The above configuration also makes it possible to determine that an abnormality has occurred based on a single detection and thus makes it possible to quickly stop an overcurrent. This in turn makes it easier to protect elements in the power supply circuit 20.

(2) In the above example embodiment, the first switch 30 is disposed on the high-potential power line LA between the high-potential output terminal of the power conversion circuit 24 and the high-potential output terminal 22A. With this configuration, for example, when the differential value reaches the threshold due to a short circuit in the load 50, it is possible to block the flow of an electric current from the power conversion circuit 24 to the load 50. This makes it possible to prevent power remaining in the power conversion circuit 24 from being discharged to the load 50. This also makes it easier to protect elements in the power supply circuit 20.

(3) In the above example embodiment, the second switch 31 is disposed on the high-potential power line LA between the battery 21 and the power conversion circuit 24. When the differential value reaches the threshold, the switch control processor 45 first switches the second switch 31 to the OFF state and then switches the first switch 30 to the OFF state. For example, when the differential value reaches the threshold due to a short circuit in the load 50, this configuration reduces the possibility that power remains in the power conversion circuit 24. Therefore, when the first switch 30 is switched to the OFF state, the electric power in the power conversion circuit 24 is less likely to be discharged to the first switch 30. This in turn makes it possible to protect the first switch 30.

Variations

The above example embodiments and the variations described below may be combined with each other as long as they do not technically conflict with each other.

Variations of Power Supply Circuit

The power supply circuit 20 may include multiple batteries 21. In this case, the multiple batteries 21 may be regarded as one direct current power supply to which the controller 40 and the voltage abnormality detection program PG are applied. Also, the controller 40 and the voltage abnormality detection program PG may be applied to each of the multiple batteries 21.

The load 50 is not limited to a server used as an example in the above example embodiment. As another example, the load 50 may be an inverter. In this case, the power supply device 10 can also supply power via the inverter to a device that operates on alternating-current power.

The power supply circuit 20 does not necessarily include the fuse 23. Also, the power supply circuit 20 may include multiple fuses 23.

The power supply circuit 20 may also include other elements. For example, the power supply circuit 20 may include a capacitor and an inductor to reduce or prevent the fluctuation of the voltage from the battery 21 and a resistor to adjust the voltage.

The power conversion circuit 24 is not limited to the examples described in the above example embodiments. As another example, the power conversion circuit 24 may be a bidirectional converter.

The power supply circuit 20 may include only the first switch 30 or only the second switch 31. When the controller 40 is able to distinguish between noise and an abnormality in the load 50 and block the flow of the electric current through the high-potential power line LA upon detecting an abnormality in the load 50, elements in the power supply circuit 20 can be more effectively protected.

The configuration of each switch is not limited to the examples described in the above example embodiments as long as the switch can be switched between the ON state and the OFF state according to a control signal from the controller 40. For example, each switch may include multiple switching elements that are connected in series or in parallel with each other. Also, each switching element is not limited to an N-type MOSFET but may be a P-type MOSFET or any other type of transistor.

Variations of Control Device for Power Supply Circuit and Program

The power supply device 10 may include multiple control devices 40. For example, the controller 40 may be provided for each switch.

The controller 40 does not need to be implemented by an MCU. For example, each of the integral processor 44 and the differential processor 43 may be implemented by an analog circuit. For example, the integral processor 44 may be implemented by an analog circuit such as a capacitor connected between the high-potential power line LA and the ground potential.

In the integral processing, the unit time interval is not limited to the examples in the above example embodiments. The unit time interval can be changed as appropriate depending on the frequency of noise that needs to be suppressed.

In the switch control process, the absolute value of the differential value does not need to be calculated as a condition to switch a switch to the OFF state as long as the absolute value of the differential value substantially exceeds a threshold represented by a positive value. For example, when the differential value is a negative value, the condition may be satisfied when the differential value falls below a threshold represented by a predetermined negative value. In this case, the absolute value of the differential value exceeds the absolute value of the threshold. That is, the absolute value of the differential value substantially exceeds the threshold.

In the switch control process, the threshold may be a fixed value that is set in advance or may be a variable value that is calculated each time in one of the steps in the voltage abnormality detection control.

In the switch control process, at least one of step S14 and step S15 may be performed. That is, only the first switch 30 may be turned off or only the second switch 31 may be turned off.

In the switch control process, the order of steps S14 and S15 may be changed. That is, the second switch 31 may be switched to the OFF state after switching the first switch 30 to the OFF state. The same applies to a case in which the power supply circuit 20 includes three or more switches. In other words, multiple switches may be switched to the OFF state in any order.

However, when the power supply circuit 20 includes multiple switches, it is preferable to change the switches to the OFF state starting with the one closest to the battery 21 along the high-potential power line LA. This makes it possible to block the flow of the electric current through the high-potential power line LA while discharging power remaining between the battery 21 and the high-potential output terminal 22A. This in turn makes it easier to protect elements in the power supply circuit 20.

While example embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A power supply device comprising:
    a battery to supply power to a load via a power line;
    a switch on the power line and switchable between an ON state and an OFF state;
    a power conversion circuit on the power line;
    a voltage detector to detect an output voltage to be output to the load;
    a differential processor configured or programmed to output a differential value corresponding to the output voltage;
    an integral processor configured or programmed to output an integral value obtained by integrating the differential value output from the differential processor over a unit time interval; and
    a switch control processor configured or programmed to change the switch to the OFF state; wherein
    the differential processor is configured or programmed to output the differential value that is obtained by differentiating a difference between the output voltage and the integral value; and
    the switch control processor is configured or programmed to change the switch to the OFF state when the differential value reaches a threshold.

2. The power supply device according to claim 1, wherein the switch is between the power conversion circuit on the power line and an output terminal connectable to the load.

3. The power supply device according to claim 2, wherein when the switch is a first switch, the power supply device further comprises a second switch on the power line between the battery and the power conversion circuit; and
    when the differential value reaches the threshold, the switch control processor is configured or programmed to switch the first switch to the OFF state after switching the second switch to the OFF state.

4. The power supply device according to claim 1, wherein the switch control processor is configured or programmed to change the switch to the OFF state when the differential value is greater than or equal to the threshold.

5. The power supply device according to claim 1, wherein the switch control processor is configured or programmed to change the switch to the OFF state when the differential value is less than or equal to the threshold.

6. The power supply device according to claim 1, further comprising a fuse connected to the battery.

7. The power supply device according to claim 1, wherein the power conversion circuit is a DC-DC boost converter or a bidirectional converter.

8. The power supply device according to claim 1, wherein the switch is a MOSFET.

9. The power supply device according to claim 1, wherein the load is a server or an inverter.

10. The power supply device according to claim 1, wherein the power supply circuit includes a capacitor and an inductor.

11. A control device for a power supply circuit including a battery to supply power to a load via a power line, a switch on the power line and switchable between an ON state and an OFF state, a power conversion circuit on the power line, and a voltage detector to detect an output voltage to be output to the load, the control device comprising:
    a differential processor configured or programmed to output a differential value corresponding to the output voltage;
    an integral processor configured or programmed to output an integral value obtained by integrating the differential value output from the differential processor over a unit time interval; and
    a switch control processor configured or programmed to change the switch to the OFF state; wherein
    the differential processor is configured or programmed to output the differential value that is obtained by differentiating a difference between the output voltage and the integral value; and the switch control processor is configured or programmed to change the switch to the OFF state when the differential value reaches a threshold.

12. The control device for the power supply circuit according to claim 11, wherein the switch control processor is configured or programmed to change the switch to the OFF state when the differential value is greater than or equal to the threshold.

13. The control device for the power supply circuit according to claim 11, wherein the switch control processor is configured or programmed to change the switch to the OFF state when the differential value is less than or equal to the threshold.

14. The control device for the power supply circuit according to claim 11, wherein the switch is between the power conversion circuit on the power line and an output terminal connectable to the load.

15. The control device for the power supply circuit according to claim 14, wherein
when the switch is a first switch, the power supply circuit includes a second switch on the power line between the battery and the power conversion circuit; and
when the differential value reaches the threshold, the switch control processor is configured or programmed to switch the first switch to the OFF state after switching the second switch to the OFF state.

16. The control device for the power supply circuit according to claim 11, further comprising a storage and an arithmetic processor configured or programmed to define and function as the differential processor, the integral processor, or the switch control processor.

17. A non-transitory computer-readable medium including a program for a power supply device including a battery to supply power to a load via a power line, a switch on the power line and switchable between an ON state and an OFF state, a power conversion circuit on the power line, a voltage detector to detect an output voltage to be output to the load, and a controller to control the switch, the program causing the controller to perform:
differential processing of outputting a differential value corresponding to the output voltage;
integral processing of outputting an integral value obtained by integrating the differential value output by the differential processing over a unit time interval; and
a switch control process of switching the switch to the OFF state when the differential value reaches a threshold; wherein
the differential processing outputs the differential value obtained by differentiating a difference between the output voltage and the integral value.

18. The non-transitory computer-readable medium including the program according to claim 17, wherein in the switch control process, the switch is switched to the OFF state when the differential value is greater than or equal to the threshold.

19. The non-transitory computer-readable medium including the program according to claim 17, wherein in the switch control process, the switch is switched to the OFF state when the differential value is less than or equal to the threshold.

* * * * *